Feb. 7, 1967   W. F. WILLIAMS   3,302,476
DETENTED DRIVE MECHANISM
Filed Dec. 3, 1964

INVENTOR.
WINSTON F. WILLIAMS

BY *Moody & Hallacher*

ATTORNEYS

United States Patent Office
3,302,476
Patented Feb. 7, 1967

3,302,476
DETENTED DRIVE MECHANISM
Winston F. Williams, Cedar Rapids, Iowa, assignor to Collins Radio Company, Cedar Rapids, Iowa, a corporation of Iowa
Filed Dec. 3, 1964, Ser. No. 415,610
7 Claims. (Cl. 74—416)

This invention relates generally to a drive mechanism and more particularly to a device for translating rotational motion through a 90° angle.

In transmitters, receivers and other electronic equipment it is frequently necessary to provide a visual display indicating an operating characteristic of the instrument. This is normally done by providing a series of rotating drums or discs inside the instrument in a manner that a portion of each drum is visible at the front of the instrument. The drums are individually rotated by a series of knobs provided on the front of the instrument. Because the drums and rotating knobs both are located on the front of the instrument it is necessary to have a gear mechanism capable of translating the rotation of the knob through 90° to effect rotation of the drums. This is normally done by providing a series of beveled, or helical, gears through which the rotation of the knob is translated to the drum. These arrangements suffer the inherent disadvantage of becoming inaccurate due to gear wear, gear slippage and backlash.

It is therefore an object of this invention to provide a device for translating rotational movement through 90° without the use of beveled gears.

It is another object of this invention to provide such a device which automatically compensates for wear due to continued use.

It is a further object of this invention to provide such a device which is free from inaccuracies due to gear slippage or backlash.

It is a further object of this invention to provide such a mechanism with a detent which provides a positive incremental rotational displacement.

These and other novel features and objects will become apparent from a reading of the following description when considered with the accompanying drawings wherein like reference numbers indicate like parts and in which.

Figure 1:
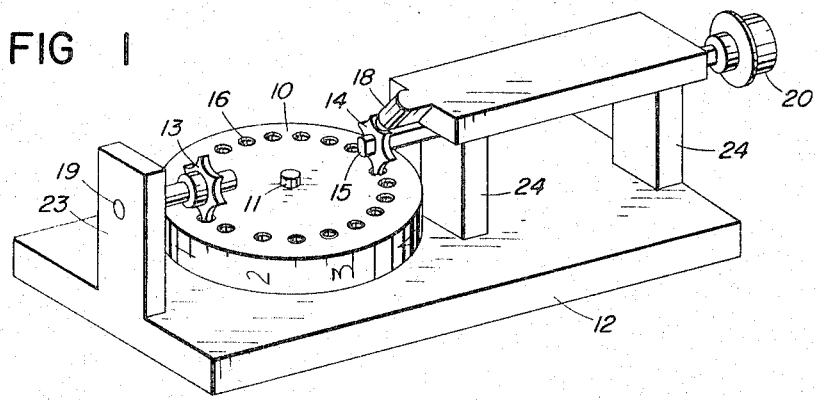
FIGURE 1 is a pictorial view of one embodiment of the invention.
Figure 2:
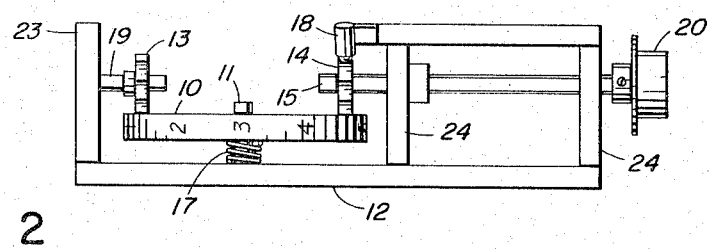
FIGURE 2 is a front view of the device shown in FIGURE 1.

FIGURE 1 shows a base 12 provided with a single support 23 and a pair of supports 24. Rigidly mounted on support 23 is a shaft 19. Supported by shaft 19 is a star wheel, or gear, 13 which is free to slide and rotate thereon. A double dee'd shaft 15 is rotatably supported by supports 24. A star wheel 14 is slidably supported by shaft 15 but is prevented from rotation upon the shaft by the two flat surfaces thereof. A shaft 11 is rigidly mounted upon the base 12 at a position which is approximately centered between star wheels 13 and 14. A drum 10 is rotatably mounted upon shaft 11 for rotation thereabout. As best shown in FIGURE 2 a spring 17 positioned around shaft 11 biases drum 10 away from base 12 and against star wheels 13 and 14. Drum 10 is provided with a series of beveled holes 16 at a given radius around wheel 10. The points of star wheels 13 and 14 engage holes 16. Holes 16 are spaced at intervals such that the succeeding points of star wheels 13 and 14 mesh with holes 16 as the star wheels are rotated. A spring biased ball detent 18 acts against star wheel 14 to assure that incremental rotation of star wheel 14 occurs during rotation of said star wheel.

The device is operated by either manually or automatically rotating knob 20 which causes rotation of shaft 15. The rotation of shaft 15 causes rotation of star wheel 14. Because the points of star wheel 14 act with the holes 16 of drum 10 rotation of the star wheel also effects rotation of drum 10. The rotation of drum 10 causes rotation of star wheel 13 and it is therefore evident that rotation of knob 20 is translated through 90° to effect rotation of drum 10. The primary function of star wheel 13 is to maintain drum 10 in a position normal to its axis of rotation about shaft 11 when acted upon by spring 17. Because drum 10 is spring biased against star wheels 13 and 14 it is free to undulate during rotation, thus preventing inaccuracies due to wear. Shaft 11 is provided with a stop which prevents drum 10 from traveling a sufficient distance to allow the teeth of the star wheels to leave engagement with holes 16. Also, because star wheels 13 and 14 are slidable on their respective shafts, the mechanism cannot "bind up" due to inaccurate hole placement, and the hole location tolerance is not as critical as would ordinarily be expected. The sliding action of the star wheels also assures the smoothest possible action of the mechanism.

It should be noted that the device can also be operated by applying the rotative force to drum 10 and thereby effect a rotation of knob 20. It should also be noted that the device can be used to reverse the direction of rotation of the applied force. This is so because as drum 10 acts upon star wheel 13 the star wheel rotates in a direction opposite from the direction of rotation of star wheel 14, for example, a clockwise rotation of star wheel 14 results in a counterclockwise rotation of star wheel 13.

Figure 3:
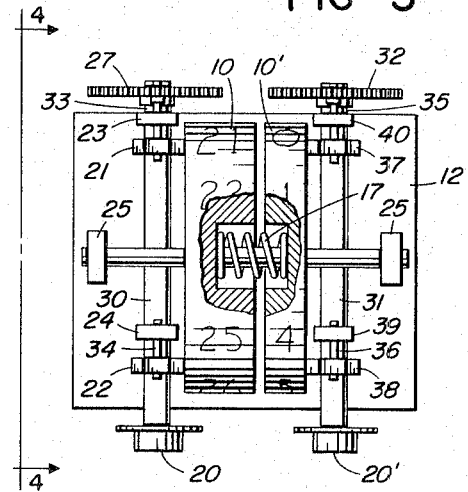
FIGURE 3 is a top view, partly in section, of another embodiment of the invention.
Figure 4:
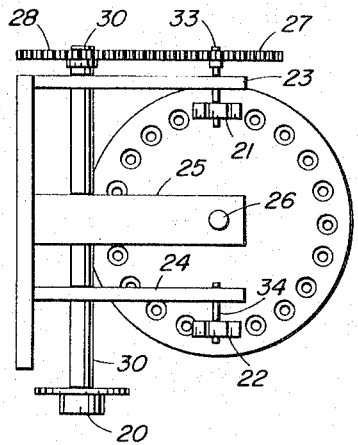
FIGURE 4 is a side view taken along line 4—4 of FIGURE 3.

Referring now to FIGURE 3 which shows a similar device provided with two drums 10 and 10'. The sectioned portion shows a single spring 17 biasing drums 10 and 10' away from each other in the same manner that FIGURE 2 shows a like spring 17 biasing drum 10 away from base 12. Drum 10 is biased against star wheels 21 and 22 by this spring action and in like manner drum 10' is biased against star wheels 37 and 38. Star wheels 21 and 22 are slidably and rotatably supported by mounts 23 and 24 respectively through their respective shafts 33 and 34. Also rotatably supported by mounts 23 and 24 is a shaft 30 which rigidly carries a knob 20 at one end and a gear 28 at the other end. Star wheel 21 is connected to a gear 27 through shaft 33 so that rotation of gear 27 results in rotation of star wheel 21. Drums 10 and 10' are mounted for rotation about a common shaft 26 which is supported by supports 25. The rotation of drums 10 and 10' is independent even although they are mounted upon the same shaft. It is therefore seen that rotation of knob 20 results in a rotation of gear 28. Because gear 28 meshes with gear 27 star wheel 21 is caused to rotate and thereby effect a rotation of drum 10 in a manner similar to that described above. Drum 10' is rotated by the turning of knob 20' through an arrangement identical to that of wheel 10.

It is therefore seen that the device of FIGURE 3 is a combination of two of the devices shown in FIGURE 1 utilizing a single spring and a single drum supporting shaft 26.

Although this invention has been described with respect to particular embodiments thereof, it is not to be so limited, as changes and modifications may be made therein which are within the spirit and scope of the invention as defined by the appended claims.

I claim:
1. A drive mechanism comprising: a base, a plurality of supports mounted on said base, a first shaft mounted in one of said supports, a second shaft mounted in an- other of said supports, a first wheel slidably mounted on said first shaft and a second wheel slidably and rotatably mounted on said second shaft, a drum mounted at angle with respect to said wheels, said drum having a plurality of spaced holes which engage with said wheels, a spring to bias said drum against said wheels to insure contact between said drum and said wheels so that rotation of said first shaft will cause rotation of said drum.

2. The drive mechanism of claim 1 wherein said wheels are star wheels.

3. The drive mechanism of claim 2 including a detent acting against said first wheel.

4. A drive mechanism comprising: a base, three supports attached to said base, a first shaft rotatably mounted in two of said supports, and a second shaft rigidly mounted in the third support, a first star wheel slidably mounted on said first shaft, a second star wheel slidably and rotatably mounted on said second shaft, a third shaft rigidly mounted on said base, a drum rotatably mounted on said third shaft, a plurality of holes in said drum spaced at equal intervals about said drum so that said holes and said star wheels engage, and a spring between said drum and said base to bias said drum against said star wheels.

5. A drive mechanism comprising: a base, a plurality of supports on said base, a shaft rigidly mounted on said supports, a first and a second drum rotatably mounted on said shaft, a plurality of gears acting against each of said drums, a spring between said drums to bias them apart and against said gears so that rotation of one gear will effect rotation of the drum with which it is in contact.

6. The drive mechanism of claim 5 wherein said drums are provided with a plurality of holes which mesh with said gears.

7. The drive mechanism of claim 6 wherein said gears are star gears.

References Cited by the Examiner
UNITED STATES PATENTS

| | | | |
|---|---|---|---|
| 671,826 | 4/1901 | Johnston | 74—351 |
| 1,043,499 | 11/1912 | Annable | 74—351 |
| 2,803,145 | 8/1957 | Fisher | 74—415 |

DAVID J. WILLIAMOWSKY, *Primary Examiner.*

H. S. LAYTON, *Assistant Examiner.*